(12) United States Patent
Park et al.

(10) Patent No.: US 10,432,495 B2
(45) Date of Patent: Oct. 1, 2019

(54) ELECTRONIC DEVICE, METHOD OF TRANSMITTING LOG INFORMATION BY ELECTRONIC DEVICE, AND SYSTEM FOR RECEIVING THE LOG INFORMATION

(71) Applicant: Samsung Electronics Co., Ltd., Suwon-si, Gyeonggi-do (KR)

(72) Inventors: Jaehyun Park, Seongnam-si (KR); Kiyoung Lim, Yongin-si (KR); Woohyuk Jang, Hwaseong-si (KR); Heyyoung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 14/487,776

(22) Filed: Sep. 16, 2014

(65) Prior Publication Data
US 2015/0081892 A1     Mar. 19, 2015

(30) Foreign Application Priority Data

Sep. 17, 2013  (KR) .................. 10-2013-0111984

(51) Int. Cl.
*H04L 12/26* (2006.01)
*H04L 29/08* (2006.01)
*H04L 12/24* (2006.01)

(52) U.S. Cl.
CPC ............ *H04L 43/10* (2013.01); *H04L 41/069* (2013.01); *H04L 41/082* (2013.01);
(Continued)

(58) Field of Classification Search
CPC ............. H04L 41/0853; H04L 41/0859; H04L 43/0817; H04L 43/10; H04L 67/145; H04L 65/80; H04L 67/1095; H04L 67/26; H04L 67/45; H04L 67/22; H04L 41/069; H04L 41/082; H04L 67/28; H04W 8/20;
(Continued)

(56) References Cited

U.S. PATENT DOCUMENTS 7,328,260 B1 * 2/2008 Muthiyan ........... H04L 41/0681
                                                           709/220
7,363,022 B2 * 4/2008 Whelan .................. H04L 29/06
                                                           455/186.1
(Continued)

FOREIGN PATENT DOCUMENTS

CN        102547939 A      7/2012
CN        103492975 A      1/2014
(Continued)

OTHER PUBLICATIONS

GSMA; Smartphone Push Notification Service Problem Statement & Requirements for Signalling Minimisation; GSM Association Application Network Efficiency; Version 1.0; Jul. 5, 2012.
(Continued)

*Primary Examiner* — Todd L Barker
(74) *Attorney, Agent, or Firm* — Jefferson IP Law, LLP (57) ABSTRACT

A method of transmitting information by an electronic device is provided. The method includes collecting log information, determining whether a keep-alive message transmission period arrives, and when the keep-alive message transmission period arrives, transmitting the log information to a push server.

16 Claims, 7 Drawing Sheets

(52) U.S. Cl.
CPC ............ *H04L 67/145* (2013.01); *H04L 67/22* (2013.01); *H04L 41/0853* (2013.01); *H04L 41/0859* (2013.01)

(58) Field of Classification Search
CPC .... H04W 52/0251; H04W 4/12; Y02B 60/46; Y02B 60/50
See application file for complete search history.

(56) References Cited

U.S. PATENT DOCUMENTS

| | | | | |
|---|---|---|---|---|
| 8,166,341 | B2* | 4/2012 | DeHaan | G06F 11/2247 714/21 |
| 8,788,881 | B2* | 7/2014 | Salomon | H04W 4/00 455/466 |
| 9,065,765 | B2* | 6/2015 | Alisawi | H04L 47/32 |
| 2005/0160168 | A1* | 7/2005 | Takanashi | G06F 3/14 709/224 |
| 2006/0089127 | A1 | 4/2006 | Muratsu | |
| 2007/0207800 | A1 | 9/2007 | Daley et al. | |
| 2008/0270598 | A1* | 10/2008 | Chen | G06Q 30/02 709/224 |
| 2008/0313006 | A1* | 12/2008 | Witter | G06Q 10/063118 705/7.17 |
| 2009/0089761 | A1* | 4/2009 | Lazzaro | G06F 11/3664 717/128 |
| 2009/0165099 | A1* | 6/2009 | Eldar | H04L 41/0806 726/5 |
| 2009/0325615 | A1* | 12/2009 | McKay | H04L 63/02 455/466 |
| 2010/0037088 | A1* | 2/2010 | Krivopaltsev | H04L 41/0681 714/4.1 |
| 2010/0312899 | A1* | 12/2010 | Herzog | H04L 67/141 709/228 |
| 2011/0208857 | A1* | 8/2011 | Gentile | H04L 43/065 709/224 |
| 2011/0231562 | A1* | 9/2011 | Karlsen | H04L 65/1016 709/228 |
| 2012/0110172 | A1 | 5/2012 | Oh et al. | |
| 2012/0131663 | A1* | 5/2012 | Anchan | H04L 29/12471 726/13 |
| 2012/0170496 | A1 | 7/2012 | Yang et al. | |
| 2012/0246303 | A1* | 9/2012 | Petersen | G06F 17/30185 709/224 |
| 2012/0270579 | A1 | 10/2012 | Seo et al. | |
| 2012/0324041 | A1* | 12/2012 | Gerber | H04L 67/26 709/217 |
| 2013/0007299 | A1 | 1/2013 | German et al. | |
| 2014/0056313 | A1* | 2/2014 | Wada | H04L 63/02 370/463 |
| 2014/0078968 | A1* | 3/2014 | Korhonen | H04W 52/0229 370/328 |
| 2014/0148205 | A1* | 5/2014 | Grinshpun | H04L 69/16 455/466 |
| 2014/0226562 | A1 | 8/2014 | Shah et al. | |
| 2014/0337472 | A1* | 11/2014 | Newton | H04L 67/32 709/217 |
| 2015/0229608 | A1* | 8/2015 | Schulz | H04L 41/0806 726/14 |
| 2015/0331739 | A1* | 11/2015 | Lan | H04L 43/10 714/55 |

FOREIGN PATENT DOCUMENTS

| | | |
|---|---|---|
| EP | 2621145 A1 | 7/2013 |
| KR | 2005-0060685 A | 6/2005 |
| KR | 2012-0044483 A | 5/2012 |
| KR | 2012-0071175 A | 7/2012 |
| KR | 2013-0013272 A | 2/2013 |
| KR | 2013-0046787 A | 5/2013 |
| KR | 2013-0050202 A | 5/2013 |
| WO | 2012144828 A2 | 10/2012 |
| WO | 2012/174006 A1 | 12/2012 |
| WO | 2013070631 A1 | 5/2013 |

OTHER PUBLICATIONS

Chinese Office Action dated Oct. 12, 2018, issued in a counterpart Chinese application No. 201480051181.9.

\* cited by examiner

ELECTRONIC DEVICE, METHOD OF TRANSMITTING LOG INFORMATION BY ELECTRONIC DEVICE, AND SYSTEM FOR RECEIVING THE LOG INFORMATION

CROSS-REFERENCE TO RELATED APPLICATION(S)

This application claims the benefit under 35 U.S.C. § 119(a) of a Korean patent application filed on Sep. 17, 2013 in the Korean Intellectual Property Office and assigned number 10-2013-0111984, the entire disclosure of which is hereby incorporated by reference.

TECHNICAL FIELD

The present disclosure relates to an electronic device, a method of transmitting information by an electronic device, and a system for transmitting information.

BACKGROUND

Recent electronic devices based on a network include not only Information Technology (IT) devices such as a smart phone, a tablet Personal Computer (PC), a computer, a notebook and the like but also home appliances such as a TeleVision (TV), a refrigerator, and a vacuum cleaner. Further, a service environment using the electronic devices has been gradually changed to a user-customized type. For example, the service environment has been changed to provide a service which understands thought and behavior of a user, such as a service which recognizes a music pattern of the user and provides new music to the user or recognizes a movement pattern of the user and provides a location-based recommended service.

Meanwhile, in order to provide the user-customized service, an electronic device collects log information which includes a use state, a processed content or the like of information used by the user and to transmit the log information to a server which can process the log information.

However, when an electronic device collects log information, the electronic device often accesses a server to transmit the log information to the server in the related arts, so resource consumption was too large.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, a method of transmitting information by an electronic device, and a system for transmitting information, and provides a method of transmitting log information using a push technique.

In accordance with an aspect of the present disclosure, a method of transmitting information by an electronic device is provided. The method includes collecting log information, determining whether a keep-alive message transmission period arrives, and when the keep-alive message transmission period arrives, transmitting the log information to a push server.

In accordance with another aspect of the present disclosure, an electronic device is provided. The electronic device includes a storage unit configured to store log information, a communication unit configured to transmit the log information, and a controller configured to collect the log information, to determine whether a keep-alive message transmission period arrives, and to control to transmit the log information to a push server when the keep-alive message transmission period arrives.

In accordance with another aspect of the present disclosure, a system for transmitting information is provided. The system includes an electronic device configured to collect log information, to determine whether a keep-alive message transmission period arrives, and to transmit the log information when the keep-alive message transmission period arrives, a push server configured to receive the log information, to transmit information on a version of changed setting information, and to make a request for a push to the electronic device in response to a request for a particular operation command, a provisioning server configured to transmit one or more pieces of setting information, information on a version of the setting information, and changed setting information to the electronic device, and an admin server configured to change the setting information and the information on the version of the setting information, to transmit the changed setting information and the changed information on the version of the setting information to the push server and the provisioning server, and to make a request for the particular operation command to the push server.

An electronic device, a method of transmitting information by an electronic device, and a system for transmitting information according to the present disclosure can efficiently manage log information and reduce power consumption of the electronic device by using a push technique.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
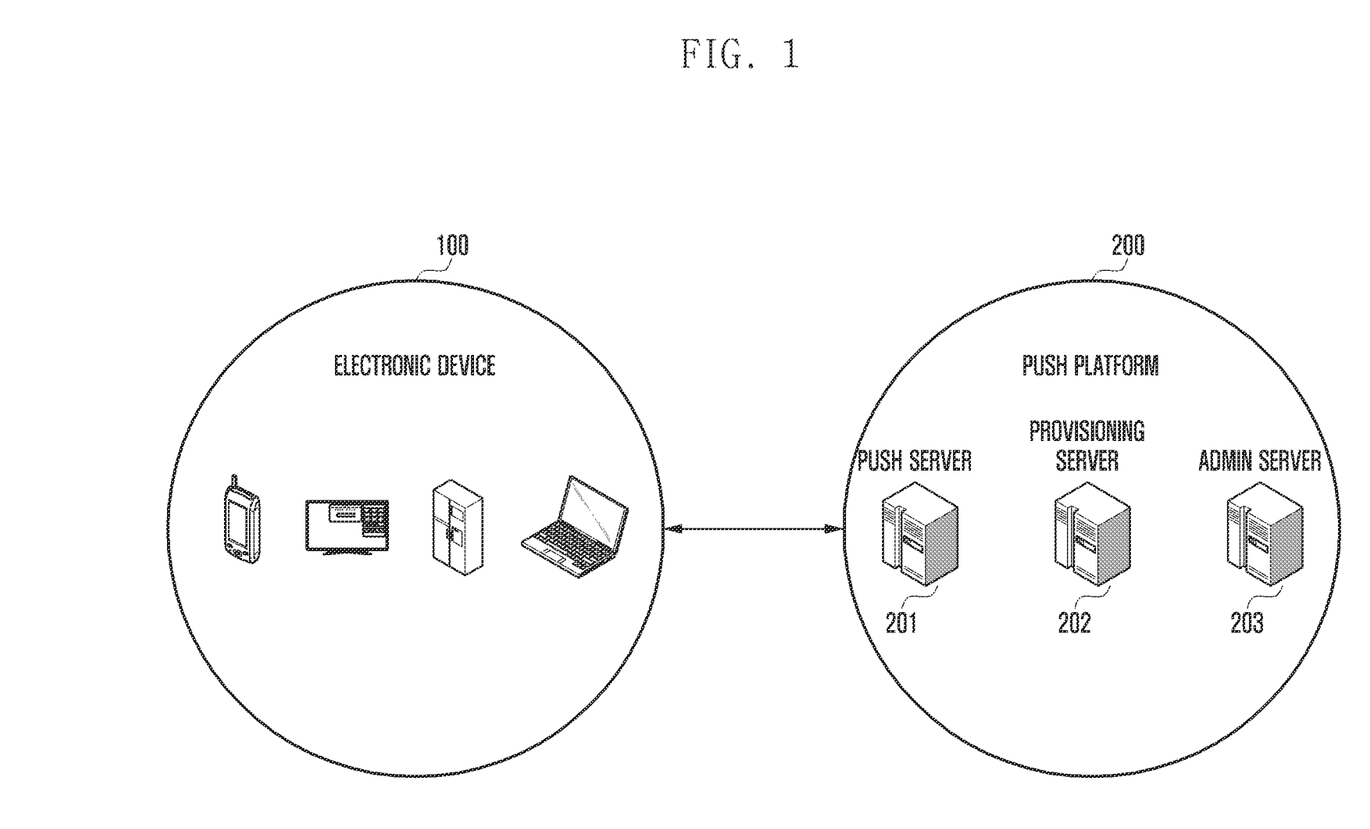
FIG. 1 illustrates an information transmitting system according to an embodiment of the present disclosure.

FIG. 1 illustrates an information transmitting system according to an embodiment of the present disclosure.

The information transmitting system includes an electronic device 100 and a push platform 200 that provides a push service. The electronic device 100 may include not only Information Technology (IT) devices such as a smart phone, a tablet Personal Computer (PC), a computer, a notebook and the like but also home appliances such as a Television (TV), a refrigerator, and a vacuum cleaner. The push platform 200 may include a push server 201, a provisioning server 202, and an administrator server (admin server) 203.

The present disclosure is applied to a push service based on a network. The push service aims at transmitting a particular message or notification to the electronic device. The push service begins with limited resources of the electronic device 100. When the push service is used, a plurality of applications executed in the electronic device 100 maintains only one common network connectivity instead of respective network connectivities and supports transmission of a message or notification to each of the applications in a side of a mobile platform, so that limits due to the limited resources can be somewhat overcome and various services can be used. The service uses push techniques such as Apple Push Notification Service (APNS) of Apple, Android Cloud to Device Messaging (C2DM) and Google Cloud Messaging (GCM) of Google, BlackBerry Push Notification Service (BPNS) of Blackberry, Samsung Push Platform (SPP) of Samsung or the like.

In general, the electronic device 100 and the push platform 200 should be logically connected to each other for the push service. User Datagram Protocol (UDP)/Transmission Control Protocol (TCP) can be used for the connection between the electronic device 100 and the push platform 200, and the push platform 200 and each electronic device 100 exchange a keep-alive message to maintain the connection there between.

At this time, a transmission period of the keep-alive message is dependent on a firewall timeout policy of a communication service provider and there is no universal convention or standard.

In order to continuously keep a push channel, an always-on connection of the electronic device 100 should be guaranteed. In a method of maintaining the always-on connection, the electronic device 100 transmits a keep-alive message such as heartbeat or ping message to a server before a firewall timeout to extend a timeout time of the channel.

The information transmitting system according to the embodiment of the present disclosure may simultaneously transmit information at a time when the electronic device 100 transmits the keep-alive message to the push platform 200, for example, the push server 201 in order to maintain the push channel. The push server 201 may receive log information transmitted from the electronic device 100. The information refers to log information which records a use state, a processed content or the like of information used by the user. For example, the log information may include a use state and/or a processed content of an application stored in the electronic device, and a state and/or a processed content about the use of peripheral devices such as a sensor, a camera, and an audio device included in the electronic device 100. For example, the log information may include a use state and/or a processed content of a peripheral device included in the electronic device 100, an application included in the electronic device 100, and an application program included in the electronic device 100.

The provisioning server 202 may transmit setting information used for transmitting the log information and information on a version of the corresponding setting information to the electronic device 100. The setting information may include log information collection setting value information for collecting log information such as an address of the push server to which one or more electronic devices 100 will transmit collected log information. The log information collection setting value information includes setting values used for collecting log information, such as a limited number of transmissions at one time, a limited number of transmissions of an application, a log information collection period, and a model name of an electronic device or an application name which is restricted from collecting log information.

The provisioning server 202 transmits information on a version of the corresponding setting information to the electronic device 100 together with the setting information. The electronic device 100 compares the version of the setting information received from the provisioning server 202 with a pre-stored version of setting information. When there is a difference between the versions, the electronic device 100 updates the setting information received from the provisioning server 202.

The admin server 203 may update the setting information according to the information on the version of the setting information and the version of the setting information. The admin server 203 transmits the changed setting information and the changed information of the version of the setting information to all push servers 201 and the provisioning server 202. The electronic device 100 may transmit collected log information to the push server 201, and may transmit the changed information on the version of the setting information when transmitting a response message of the keep-alive message to the push server 201. The electronic device 100 receives the changed information on the version of the setting information. When there is a difference between the received version and a pre-stored version of setting information, the electronic device 100 may receive changed setting information from the provisioning server 202. The admin server 203 may make a request for a particular operation command to the push server 201. The push server 201 may make a request for the push to the electronic device 100 in response to the particular operation command of the admin server 203. The electronic device 100 may perform a particular operation according to the push request and transmit a result of the particular operation to the push server 201. The particular operation command may include a command to start collecting one or more pieces of log information, a command to stop collecting log information, a command to collect emergency log information, a command to stop collecting emergency log information, or a provision command. The command to start collecting log information may instruct the electronic device 100 to start collecting log information according to a keep-alive period and the command to stop collecting log information instructs the electronic device 100 to stop collecting log information which has been collected according to a keep-alive period. The command to collect emergency log information instructs the electronic device 100 to start collecting log information regardless of a keep-alive period and the command to stop collecting emergency log information instructs the electronic device 100 to stop collecting log information which has been collected by the command to start collecting emergency log information. The provision command instructs the electronic device 100 to immediately receive changed setting information from the provisioning server 202.

Figure 2:
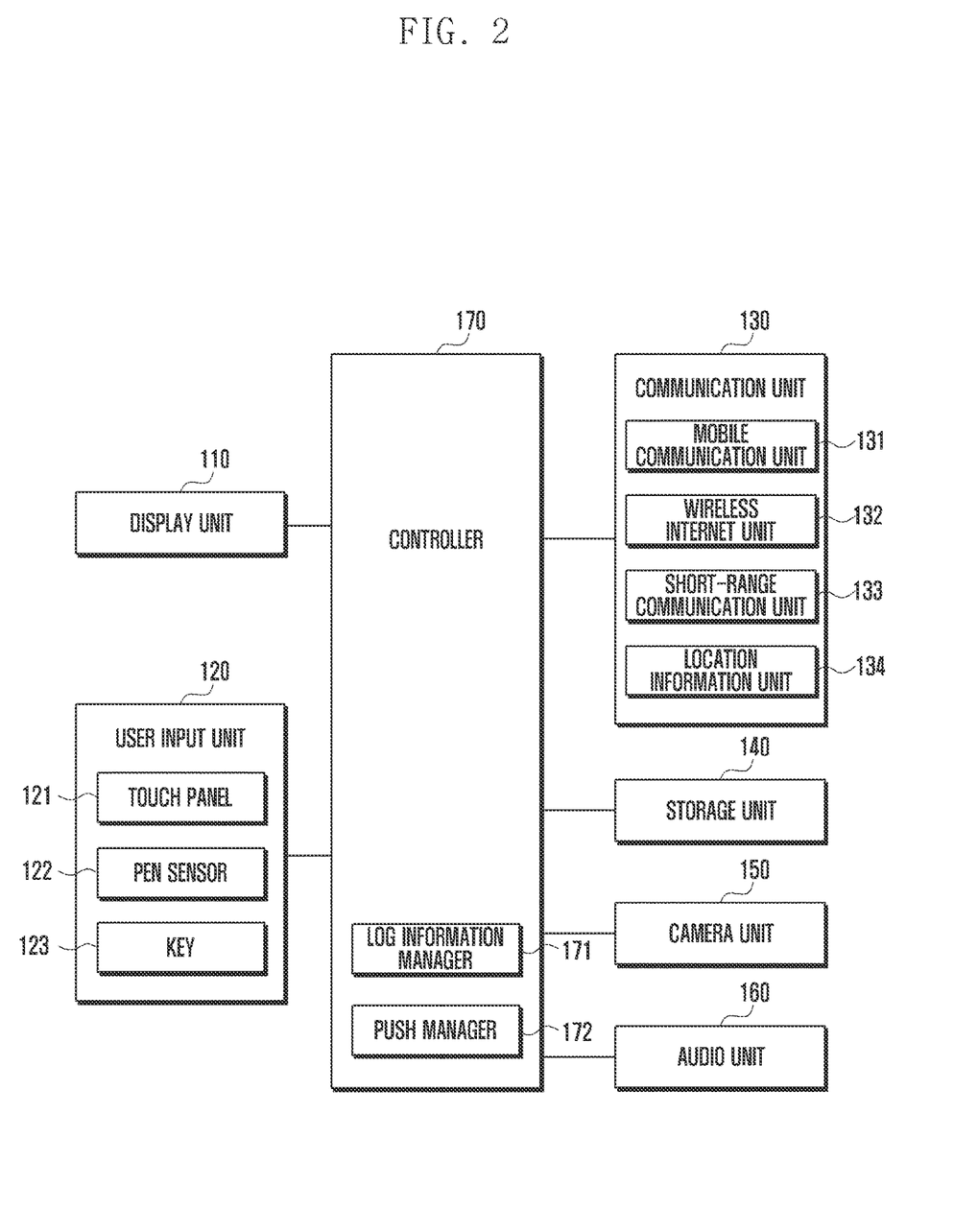
FIG. 2 is a block diagram illustrating a configuration of an electronic device according to an embodiment of the present disclosure.

FIG. 2 is a block diagram illustrating a configuration of the electronic device 100 according to an embodiment of the present disclosure.

The configuration of the electronic device 100 according to the embodiment of the present disclosure may be applied to a smart phone, but the configuration of the electronic device 100 is not limited thereto and may be applied to various devices. For example, the configuration of the electronic device 100 may be applied to not only IT devices such as a tablet PC, a Portable Multimedia Player (PMP), a Personal Digital Assistant (PDA), a laptop PC, and a wearable device but also electronic devices such as a TV, a refrigerator, a vacuum cleaner, and any other similar and/or suitable device.

The electronic device 100 may include a display unit 110, a user input unit 120, a communication unit 130, a storage unit 140, a camera unit 150, an audio unit 160, and a controller 170.

The display unit 110 may perform a function of displaying an image or data to a user. The display unit 110 may include a display panel. The display panel may use, for example, a Liquid Crystal Display (LCD) or an Active Matrix Organic Light Emitting Diode (AM-OLED). The display unit 110 may further include a controller that controls the display panel. The display panel may be implemented to be, for example, flexible, transparent, or wearable.

Meanwhile, the display unit 110 may be combined with the touch panel 121 and provided in the form of touch screen. For example, the touch screen may include an integral module in which the display panel and the touch panel are combined in a laminated structure.

The user input unit 120 may receive various commands from a user. The user input unit 120 may include, for example, at least one of a touch panel 121, a pen sensor 122, and a key 123.

The touch panel 121 may recognize a touch input by the user in at least one of a capacitive type, a resistive type, an infrared type, and an acoustic wave type. The touch panel 121 may further include a controller (not shown). Meanwhile, in the capacitive type, a proximity recognition is possible as well as a direction touch. The touch panel 121 may further include a tactile layer. In this case, the touch panel 121 may provide a user with a tactile reaction. The pen sensor 122 may be implemented, for example, using a separate pen recognition sheet in the same way as a method of receiving a touch input of the user. The key 123 may include, for example, a mechanical key or a touch key. The mechanical key may include at least one of, for example, a power button disposed on one side of the electronic device 100 to turn on a display of the electronic device 100 in the push, one or more volume buttons disposed on the other side of the electronic device 100 to control volume in the push, and a home button disposed on a lower center of the display unit 110 of the electronic device 100 to move a screen to a home screen in the push. The touch key is disposed on, for example, a lower end of the display unit 110 of the electronic device 100. The touch key may include at least one of a menu key disposed on one lower side of the display unit 110 of the electronic device 100 to provide a menu related to a content currently displayed when touched and a return key disposed on the other lower side of the display unit 110 of the electronic device 100 to provide a function of retuning to a previous screen of the screen currently displayed when touched.

The communication unit 130 may include at least one of a mobile communication unit 131, a wireless Internet unit 132, a short-range communication unit 133, and location information unit 134.

The mobile communication unit 131 transmits/receives a wireless signal to/from at least one of a base station, an external terminal, and a server over a mobile communication network. The wireless signal may include a voice call signal, a video call signal, or various data according to transmission/reception of text/multimedia messages.

The wireless Internet unit 132 performs a function for an access to a wireless Internet. Use may be made of wireless Internet technologies, such as Wireless Local Area Network (WLAN) (Wi-Fi), Wireless broadband (Wibro), World Interoperability for Microwave Access (Wimax), High Speed Downlink Packet Access (HSDPA) and the like.

The short-range communication unit 133 may perform a function for short-range communication. Use may be made of short-range technologies, such as Bluetooth, Radio Frequency IDentification (RFID), Infrared Data Association (IrDA), Ultra WideBand (UWB), ZigBee and the like.

The location information unit 134 performs a function for obtaining or identifying a location of a mobile terminal. The location information unit 134 may obtain location information by using a Global Navigation Satellite System (GNSS). GNSS is a term used for describing wireless navigation satellite systems in which predetermined types of wireless navigation receivers rotate around the earth and transmit reference signals for determining the earth's surface or locations of the wireless navigation receivers near the earth's surface. GNSS includes Global Positioning System (GPS) operated by the USA, Galileo operated by the European Union, Global Orbiting Navigational Satellite System (GLONASS) operated by Russia, COMPASS operated by China, and Quasi-Zenith Satellite System (QZSS) operated by Japan.

Additionally, the communication unit 130 may include a network interface (for example, Local Area Network (LAN)

card) or a modem for connecting the hardware 100 with a network (for example, Internet, LAN, Wide Area Network (WAN), telecommunication network, cellular network, satellite network or Plain Old Telephone Service (POTS).

The storage unit 140 may include at least one of an internal memory and an external memory.

The internal memory may include at least one of a volatile memory (e.g., a Dynamic Random Access Memory (DRAM), a Synchronous Dynamic RAM (SDRAM), etc.), a non-volatile memory (e.g., an One Time Programmable Read-Only Memory (OTPROM), a Programmable ROM (PROM), an Erasable and Programmable ROM (EPROM), an Electrically Erasable and Programmable ROM (EEPROM), a Mask ROM, a Flash ROM, etc.), a Hard Disk Drive (HDD), or a Solid State Drive (SSD). According to an embodiment, the controller 170 may load a command or data received from at least one of the non-volatile memory and other components in the volatile memory and process the loaded command or data. Further, the controller 170 may store the data received from or generated by other components in the non-volatile memory.

The external memory may include at least one of a Compact Flash (CF), a Secure Digital (SD), a Micro Secure Digital (Micro-SD), a Mini Secure Digital (Mini-SD), an extreme Digital (xD) and a memory stick.

The storage unit 140 may store an operating system for controlling resources of the electronic device 100 and an application program for an operation of an application. The operating system may include a kernel, middleware, an Application Program Interface (API) and the like. The operating system may use Android, iOS, Windows, Symbian, Tizen, Bada or the like.

The kernel may include a system resource manager which can manage resources and a device driver. The resource manager may include, for example, a controller manager, a memory unit manager, or a file system manager and may perform a function of controlling, allocating, or withdrawing system resources. The device driver may access various components of the electronic device 100 in a software manner to control them. To this end, the device driver may be divided into individual driver module parts provided by an interface and a hardware company. The device driver may include at least one of, for example, a display driver, a camera driver, a Bluetooth driver, a shared memory driver, a Universal Serial Bus (USB) driver, a keypad driver, a Wi-Fi driver, an audio driver, and an Inter-Process Communication (IPC) driver.

The middleware may include a plurality of modules implemented in advance to provide functions commonly used for various applications. The middleware may provide the commonly used functions through the API such that the application can efficiently use limited system resources within the electronic device. The middleware may include at least one of, for example, an application manager, a window manager, a multimedia manager, a resource manager, a power manager, a database manager, and a package manager. Further, according to an implementation example, the middleware may include at least one of a connectivity manager, a notification manager, a location manager, a graphic manager, and a security manager. Further, the middleware may include a runtime library or other library modules according to an implementation. The runtime library is a library module that a compiler uses in order to add a new function through a programming language while an application is being executed. For example, the runtime library may execute input and output, memory management, a function associated with an arithmetic function or the like.

The middleware may generate a new middleware module through a combination of various functions of the aforementioned internal component modules and use the generated new middleware module. Meanwhile, the middleware may provide a module specified for each type of an operating system to provide a differentiated function.

The API corresponds to a set of API programming functions, and may be provided in a different configuration according to the OS. When the OS corresponds to Android or iOS, for example, one API set may be provided for each platform. When the OS corresponds to Tizen, for example, two or more API sets may be provided.

The application may perform one or more functions by using an application program. The application may be classified into, for example, a preloaded application and a third party application. The application may include, for example, a home application executing a home screen, a dialer application, a Short Message Service (SMS)/Multimedia Message service (MMS) application, an Instant Message (IM) application, a browser application, a camera application, an alarm application, a contacts (or address book) application, a voice dial application, an email application, a calendar application, a media player, an album application, and a clock application.

The storage unit 140 stores collected data in the communication unit 130, the user input unit 120, the camera unit 150, and the audio unit 160. The storage unit 140 stores tag information generated by the controller 170 by using the collected data.

The camera unit 150 may photograph a still image and a moving image, and may include one or more image sensors (for example, a front lens or a rear lens), an Image Signal Processor (ISP) (not illustrated), or a flash LED (not illustrated) according to an implementation example.

Meanwhile, the camera unit 150 may include at least a part of the controller 170. For example, the camera unit 150 may include operations to correct an image and calculating a feature of the image as well as an operation to obtain the image. In this case, the camera unit 150 may be a functional module having a hardware module and a software module.

The audio unit 160 may bi-directionally convert a voice and an electrical signal. The audio unit 160 may include at least one of, for example, a speaker, a receiver, earphones, and a microphone to convert input or output voice information.

The controller 170 may control a plurality of hardware and software components connected to the controller 170 by driving an operating system and an application program and may process various pieces data including multimedia data and perform calculations. The controller 170 may be implemented by a System on Chip (SoC) and may further include a Graphic Processing Unit (GPU).

The controller 170 may include a log information manager 171 and a push manager 172. The log information manager 171 may collect log information by using the API of the application or periodically collect log information. The push manager 172 may include a push client. When a predetermined period arrives, the push manager 171 may generate a keep-alive message or transmit the keep-alive message and log information to the push platform 200 to maintain a push channel.

Figure 3:
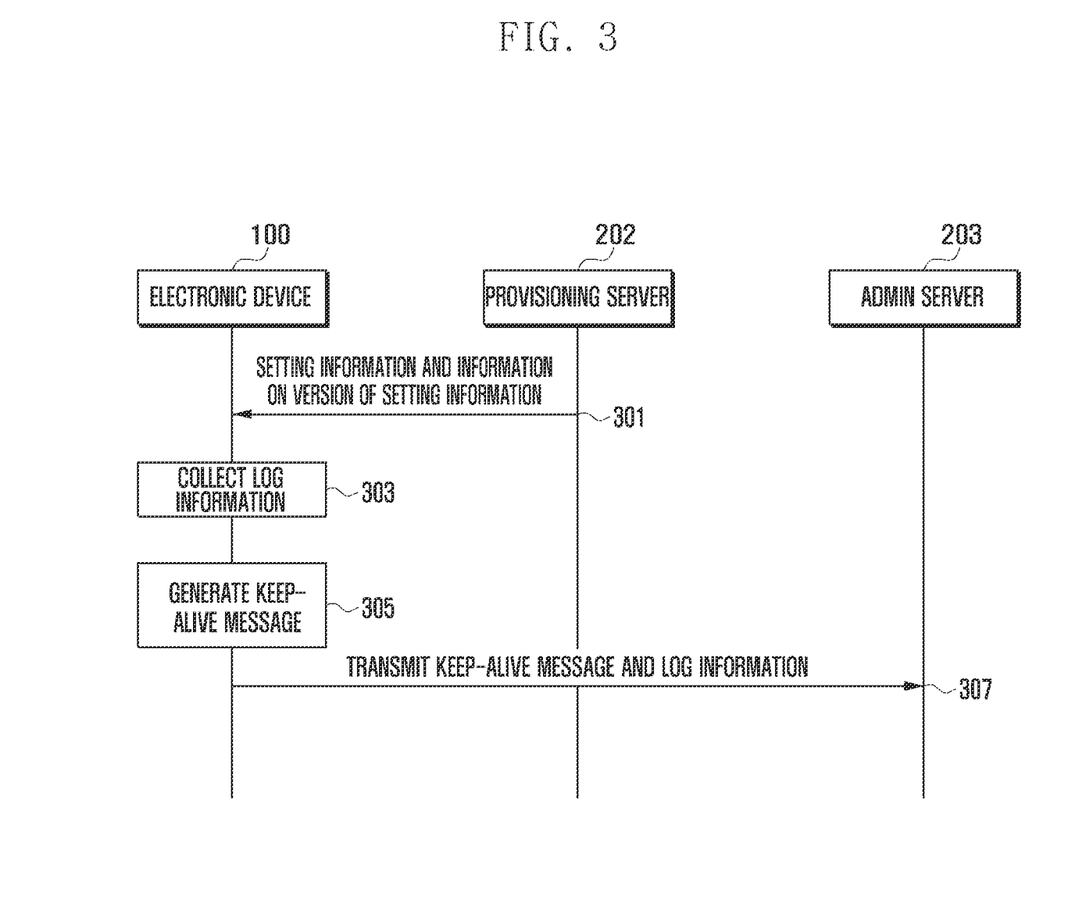
FIG. 3 is a flowchart illustrating an information transmitting method according to an embodiment of the present disclosure.

FIG. 3 is a flowchart illustrating an information transmitting method according to an embodiment of the present disclosure.

The provisioning server 202 transmits setting information and information on a version of the setting information to the electronic device 100 in operation 301. The electronic device 100 stores the setting information and the information on the version of the setting information received from the provisioning server 202. The setting information may include log information collection setting value information for collecting log information such as an address of the push server to which one or more electronic devices 100 will transmit collected log information. The log information collection setting value information may include setting values used for collecting log information, such as a limited number of transmissions of log information at one time, a limited number of transmissions of log information in one day, a limited number of transmissions of log information for each application, a log information collection period, a model name or an application name which is restricted from collecting log information. The information on the version of the setting information may inform of information on the content of the changed setting information. For example, in the information on the version of the setting information, a number of times by which the setting information is changed may be indicated by a number. For example, the electronic device 100 transmits a keep-alive message and/or log information according to an address of the push server 201 included in the setting information. The electronic device 100 may identify a version of the collected log information of the electronic device 100 according to the information on the version of the setting information and may identify a list of log information to be collected according to the log information collection setting value information included in the setting information. The electronic device 100 collects log information of the electronic device 100 according to the setting information in operation 303. The electronic device 100 generates a keep-alive message to maintain a push channel in operation 305. The electronic device 100 transmits the keep-alive message and the log information to the push server 201 in operation 307. For example, the electronic device 100 transmits the log information at a time when the electronic device 100 transmits the keep-alive message to the push server 201 in operation 307. The electronic device 100 may transmit the log information to the push server 201 in the form of Hypertext Transfer Protocol Secure (HTTPS)/Transmission Control Protocol (TCP) in operation 307.

Figure 4:
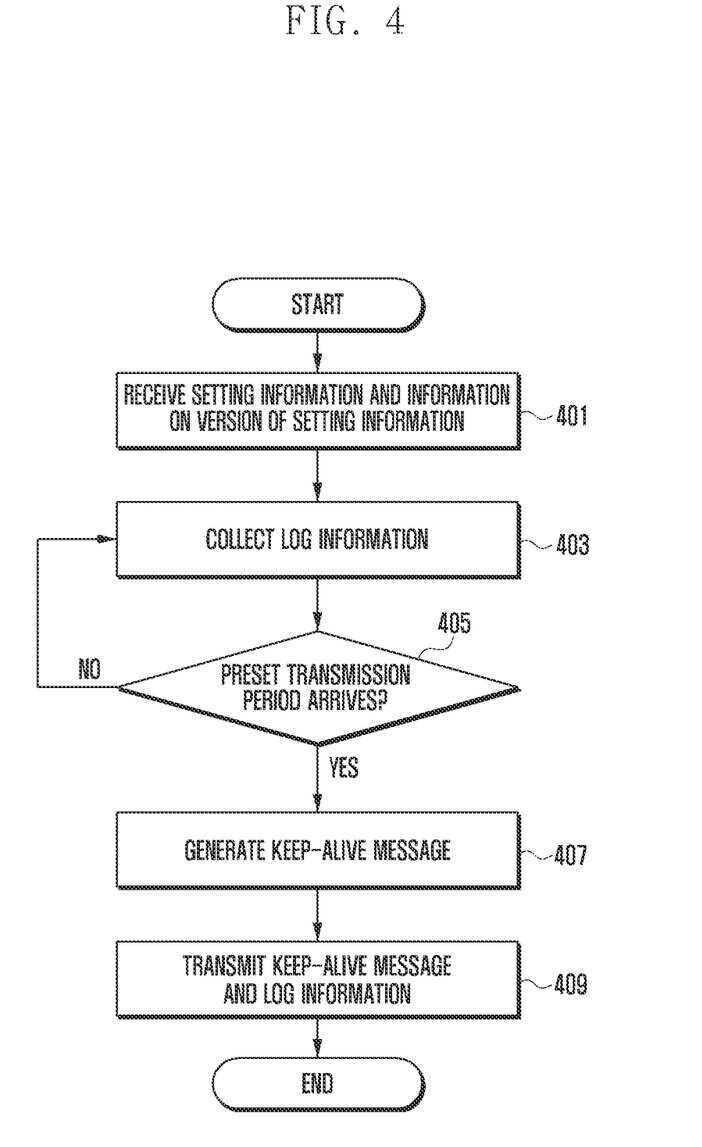
FIG. 4 is a flowchart illustrating an information transmitting method by an electronic device according to an embodiment of the present disclosure.

FIG. 4 is a flowchart illustrating an information transmitting method by the electronic device 100 according to an embodiment of the present disclosure. The information transmitting method by the electronic device 100 according to an embodiment of the present disclosure will be described below with reference to FIGS. 3 and 4.

The electronic device 100 receives setting information and information on a version of the setting information received from the provisioning server 202 in operation 401. The electronic device 100 may receive the setting information and the information on the version of the setting information and store the received information in the storage unit 140, and the controller 170 may control log information and a push service by using the stored setting information. For example, the electronic device 100 may transmit a keep-alive message and/or log information to the push server 201 according to a keep-alive message transmission period included in the setting information. At this time, the transmission period may be included in the setting information transmitted from the provisioning server 202 or may be internally configured by the electronic device 100.

The electronic device 100 collects log information in operation 403. For example, the log information may include a use state and/or a processed content of an application stored in the electronic device, and a state and/or a processed content about the use of peripheral devices such as a sensor, a camera, and an audio device included in the electronic device 100. For example, the log information may include a use state and/or a processed content of a peripheral device included in the electronic device 100, an application included in the electronic device 100, and an application program included in the electronic device 100. The electronic device 100 may identify a version of collected log information before transmitting the log information to the push server 201 (for example, before updating the log information) according to log information collection setting value information included in the setting information. The electronic device 100 may collect log information by identifying a target to be collected according to the log information collection setting value information included in the setting information. The collected log information may be stored in the storage unit 140 under a control of the controller 170.

The electronic device 100 determines whether a preset transmission period arrives in operation 405. The transmission period may be transmitted from the outside of the electronic device 100 or internally configured by the electronic device 100. The electronic device 100 determines whether a transmission period when the keep-alive message for maintaining a push channel is transmitted to the push server 201 arrives in operation 405. When the preset transmission period does not arrive, for example, when the transmission period when the keep-alive message for maintaining the push channel is transmitted to the push server 201 does not arrive, the electronic device 100 continuously collects log information.

When the preset transmission period arrives, for example, the transmission period when the keep-alive message for maintaining the push channel is transmitted to the push server 201 arrives, the electronic device 100 generates the keep-alive message in operation 407.

When the keep-alive message for maintaining the push channel is generated, the electronic device 100 may transmit the keep-alive message and collected log information to the push server 201 in operation 409. For example, the electronic device 100 may transmit log information, which is collected at the time when the keep-alive message for maintaining the push channel is transmitted, to the push server 201 in operation 409.

Figure 5:
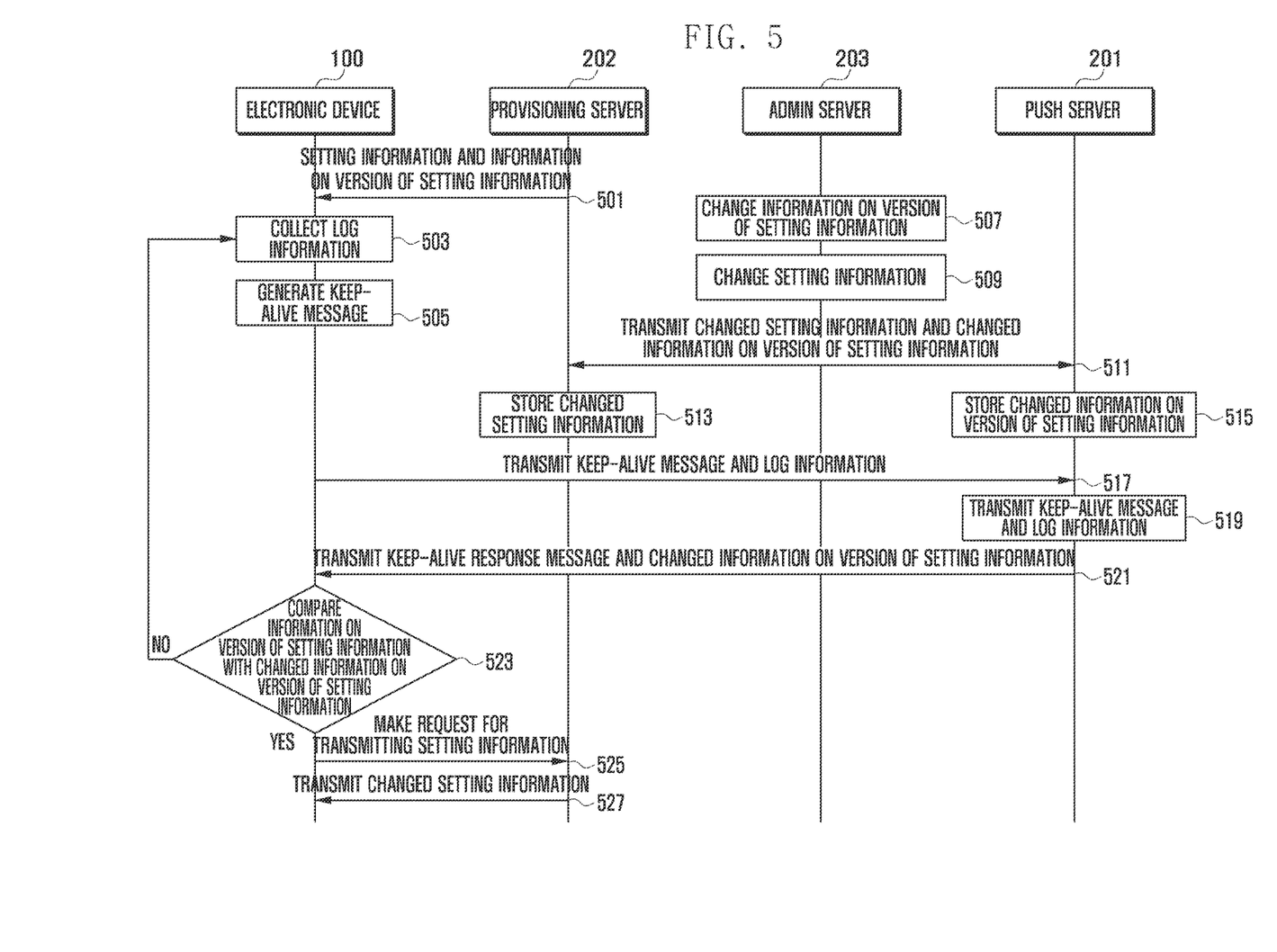
FIG. 5 is a flowchart illustrating an information transmitting method according to another embodiment of the present disclosure.

FIG. 5 is a flowchart illustrating an information transmitting method according to another embodiment of the present disclosure.

The provisioning server 202 transmits setting information and information on a version of the setting information to the electronic device 100 in operation 501. The setting information may include log information collection setting value information for collecting log information such as an address of the push server to which the electronic devices 100 will transmit collected log information. The log information collection setting value information may include setting values used for collecting log information, such as a limited number of transmissions of log information at one time, a limited number of transmissions of log information in one day, a limited number of transmissions of log information for each application, a log information collection period, and a model name or an application name which is restricted from collecting log information. For example, the electronic device 100 transmits a keep-alive message and/or log information according to an address of the push server 201 included in the setting information. The electronic device 100 may identify whether the setting information is used to be updated according to the version of the setting information. For example, the electronic device 100 compares information on versions of the setting information and thus can compare the content of the setting information included in a previous version with the content of the latest setting information. When the changed information on the version of the setting information transmitted from the push server 201 is different from the pre-stored information on the version of the setting information through a comparison there between, the electronic device 100 may receive the changed setting information from the provisioning server 202.

The electronic device 100 collects log information of the electronic device 100 according to the setting information in operation 503. The electronic device 100 generates a keep-alive message to maintain a push channel in operation 505.

The admin server 203 may change the setting information and the version of the setting information in operation 507. For example, the admin server 203 may change the setting information in operation 507. The changeable setting information may include the content, type, and a collection method of log information to be collected when the electronic device 100 collects the log information. When the number of electronic devices 100 is plural, the content, type, and a collection method of log information of a plurality of electronic devices 100 in a particular region may be changed. The admin server 203 may assign a new version to the changed setting information in operation 509. The admin server 203 may transmit the changed setting information and the changed information on the version of the setting information to the provisioning server 202 and the push server 201 in operation 511. In another embodiment of the present disclosure, the admin server 207 may change the setting information and the information on the version of the setting information in operation 507 and transmit the changed setting information and the changed information on the version of the setting information, and the electronic device 100 may receive the changed setting information and the changed information on the version of the setting information.

The provisioning server 202 stores the changed setting information (for example, a changed log information collection setting value information version) received from the admin server 203 in operation 513. The provisioning server 202 may store the changed setting information (for example, changed log information collection setting value information) received from the admin server 203 instead of the previously stored setting information in operation 513.

The push server 201 may store the changed version of the setting information in operation 515. The push server 201 may cache the changed version of the setting information in operation 515.

The electronic device 100 transmits the keep-alive message and the log information to the push server 201 in operation 517. For example, the electronic device 100 transmits the log information at a time when the electronic device 100 transmits the keep-alive message to the push server 201 in operation 517. The electronic device 100 may transmit the log information to the push server 201 in the form of HTTPS/TCP in operation 517.

The push server 201 generates a keep-alive response message in operation 519. For example, when the push server 201 receives the keep-alive message and/or the log information from the electronic device 100, the push server 201 generates the keep-alive response message to be transmitted to the electronic device 100 in response to the keep-alive message and/or the log information in operation 519. The push server 201 may transmit the keep-alive response message and information on the version of the changed setting information which is stored (for example, which is cached) to the electronic device 100 in operation 521. For example, the push server 201 may transmit the information on the version of the changed setting information which is stored (for example, which is cached) at the time when the keep-alive response message is transmitted to the electronic device 100 in operation 521.

The electronic device 100 compares the information on the version of the changed setting information received from the push server 201 with information on a pre-stored version of setting information in operation 523. When there is no difference between the information on the version of the changed setting information received from the push server 201 and the information on the pre-stored version of the setting information as a result of the comparison, the electronic device 100 proceeds to operation 503 to collect log information.

When there is a difference between the information on the version of the changed setting information received from the push server 201 and the information on the pre-stored version of the setting information as a result of the comparison, the electronic device 100 may make a request for the setting information to the provisioning server 202 to update the setting information in operation 525.

The provisioning server 202 having received the request for the setting information from the electronic device 100 may transmit the stored changed setting information to the electronic device 100 in operation 527.

Figure 6:
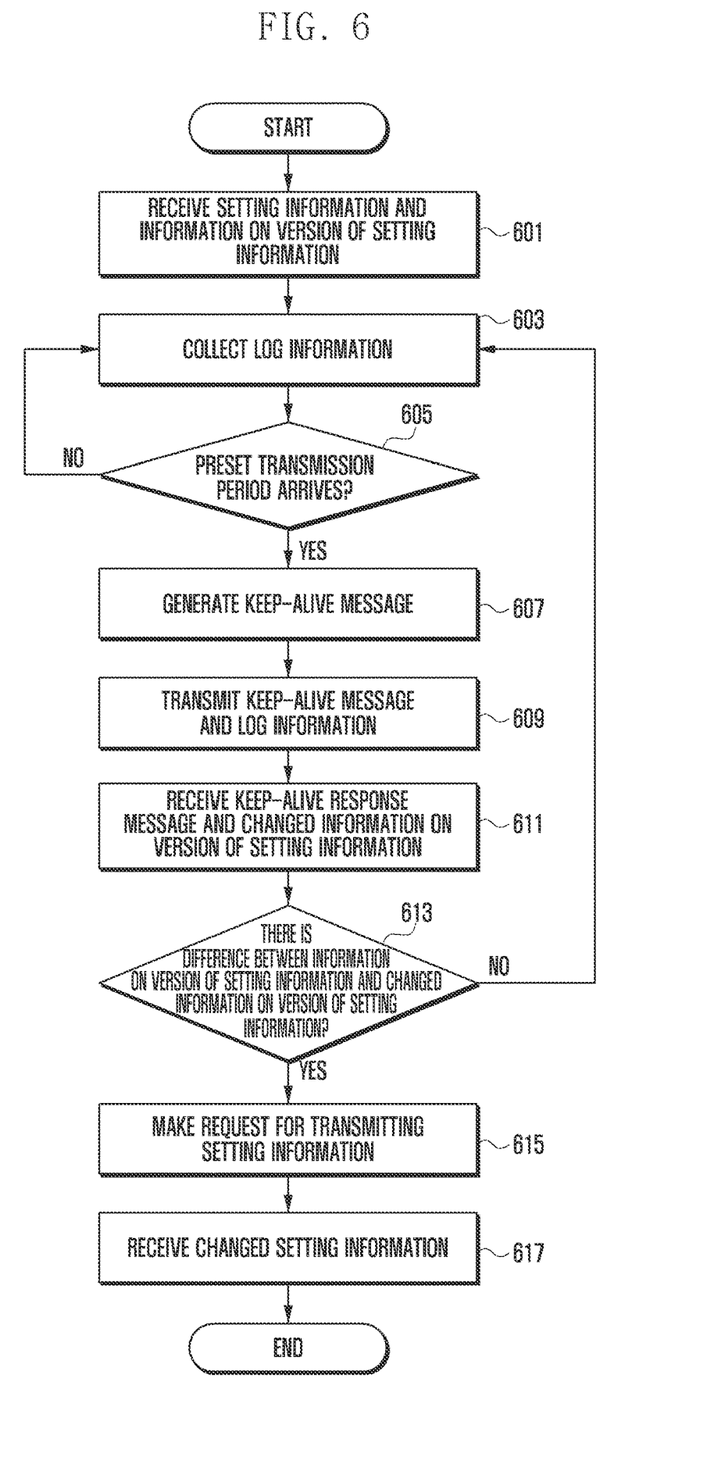
FIG. 6 is a flowchart illustrating an information transmitting method by an electronic device according to another embodiment of the present disclosure.

FIG. 6 is a flowchart illustrating an information transmitting method of the electronic device 100 according to another embodiment of the present disclosure. The information transmitting method by the electronic device 100 according to another embodiment of the present disclosure will be described below with reference to FIGS. 5 and 6.

The electronic device 100 receives setting information and information on a version of the setting information received from the provisioning server 202 in operation 601. The electronic device 100 may receive the setting information and the information on the version of the setting information and store the received information in the storage unit 140, and the controller 170 may control log information and a push service by using the stored setting information. For example, the electronic device 100 may transmit a keep-alive message and/or log information to the push server 201 according to a keep-alive message transmission period included in the setting information. At this time, the transmission period may be included in the setting information transmitted from the provisioning server 202 or may be internally configured by the electronic device 100.

The electronic device 100 collects log information in operation 603. For example, the log information may include a use state and/or a processed content of an application stored in the electronic device, and a state and/or a processed content about the use of peripheral devices such as a sensor, a camera, and an audio device included in the electronic device 100. For example, the log information may include a use state and/or a processed content of a peripheral device included in the electronic device 100, an application included in the electronic device 100, and an application program included in the electronic device 100. The electronic device 100 may collect log information by identifying a target to be collected according to the log information collection setting value information included in the setting information. The collected log information may be stored in the storage unit 140 under a control of the controller 170. The log information collection setting value information may include setting values used for collecting log information, such as a limited number of transmissions of log information at one time, a limited number of transmissions of log information in one day, a limited number of transmissions of log information for each application, a log information collection period, and a model name or an application name which is restricted from collecting log information.

The electronic device 100 determines whether a preset transmission period arrives in operation 605. The transmission period may be transmitted from the outside of the electronic device 100 or internally configured by the electronic device 100. The electronic device 100 determines whether a transmission period when the keep-alive message for maintaining a push channel is transmitted to the push server 201 arrives in operation 605. When the preset transmission period does not arrive, for example, when the transmission period when the keep-alive message for maintaining the push channel is transmitted to the push server 201 does not arrive, the electronic device 100 continuously collects log information.

When the preset transmission period arrives, for example, the transmission period when the keep-alive message for maintaining the push channel is transmitted to the push server 201 arrives, the electronic device 100 generates the keep-alive message in operation 607.

When the keep-alive message for maintaining the push channel is generated, the electronic device 100 may transmit the keep-alive message and collected log information to the push server 201 in operation 609. For example, the electronic device 100 may transmit log information, which is collected at the time when the keep-alive message for maintaining the push channel is transmitted, to the push server 201 in operation 609.

The electronic device 100 may receive a keep-alive response message corresponding to a response message of the keep-alive message and changed information on the version of the setting information from the push server 201 in operation 611. For example, the electronic device 100 may receive the changed information on the version of the setting information at the time when the keep-alive response message corresponding to the response message of the keep-alive message is received from the push server 201 in operation 611.

The electronic device 100 may determine whether there is a difference between the changed information on the version of the setting information received from the push server 201 and pre-stored information on a version of setting information in operation 613. When there is no difference between the pre-stored version of the setting information and the changed information on the version of the setting information, the electronic device 100 proceeds to operation 603 to collect log information.

When there is a difference between the pre-stored version of the setting information and the changed information on the version of the setting information, the electronic device 100 makes a request for transmitting the setting information to the provisioning server 202 in operation 615. The electronic device 100 receives the changed setting information from the provisioning server 202 after the provisioning server 202 transmits the same in response to the request for transmitting the setting information by the electronic device 100.

Figure 7:
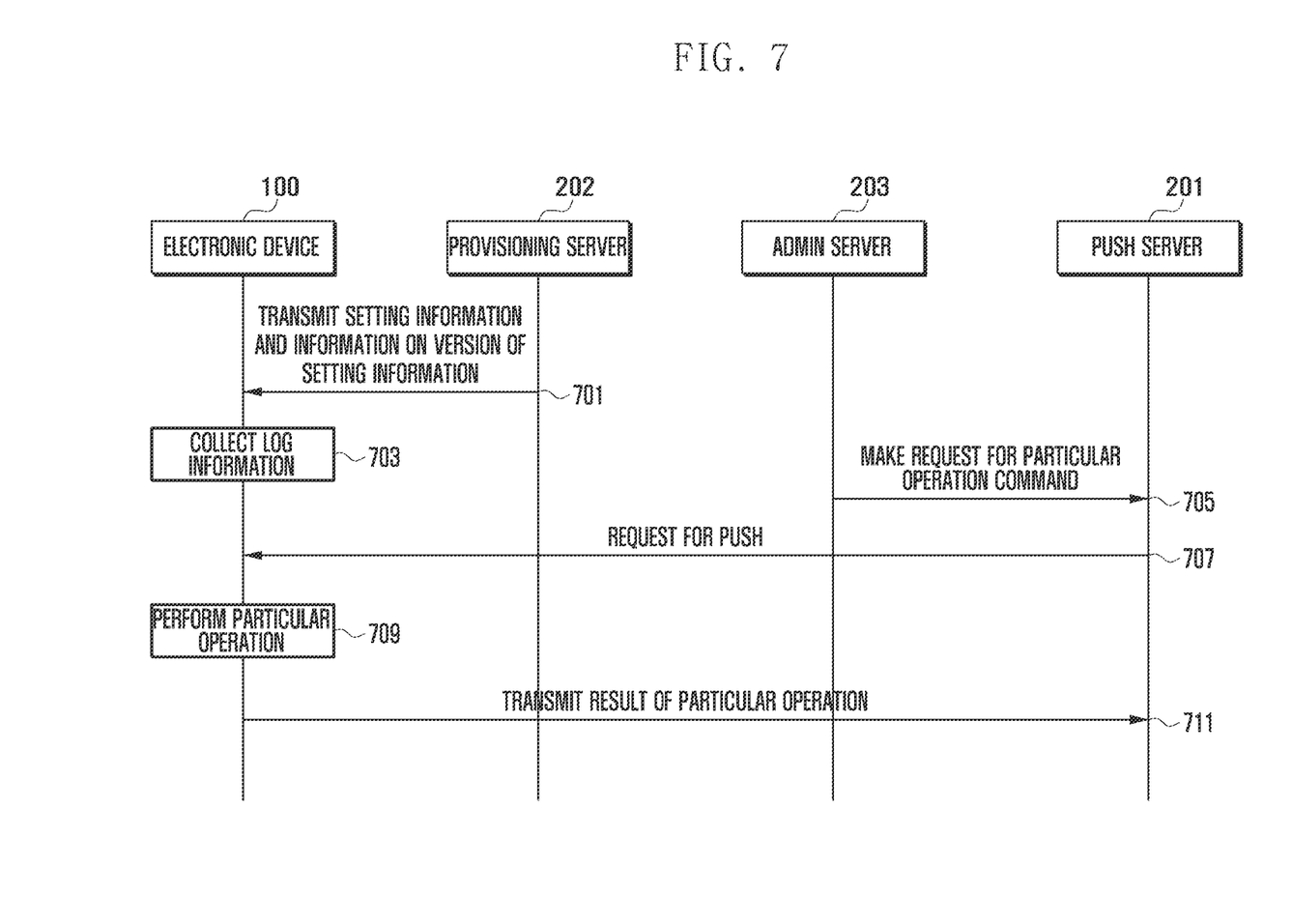
FIG. 7 is a flowchart illustrating an information transmitting method according to another embodiment of the present disclosure.

FIG. 7 is a flowchart illustrating an information transmitting method according to another embodiment of the present disclosure.

The provisioning server 202 transmits setting information and information on a version of the setting information to the electronic device 100 in operation 701. The electronic device 100 stores the setting information and the information on the version of the setting information received from the provisioning server 202. The setting information may include a log information collection setting value information for collecting log information such as an address of the push server to which one or more electronic devices 100 will transmit collected log information. The log information collection setting value information may include setting values used for collecting log information, such as a limited number of transmissions of log information at one time, a limited number of transmissions of log information in one day, a limited number of transmissions of log information for each application, a log information collection period, and a model name or an application name which is restricted from collecting log information. For example, the electronic device 100 transmits a keep-alive message and/or log information according to an address of the push server 201 included in the setting information. The electronic device 100 may identify a version of the collected log information of the electronic device 100 according to a log information configuration version included in the setting information and may identify a list of log information to be collected according to a log information configuration list included in the setting information. The electronic device 100 collects log information of the electronic device 100 according to the setting information in operation 703.

The admin server 203 may make a request for a particular operation command to the push server 201 in operation 705. The particular operation command may include a command to start collecting one or more pieces of log information, a command to stop collecting log information, a command to collect emergency log information, a command to stop collecting emergency log information, or a provision command. The command to start collecting log information instructs the electronic device 100 to start collecting log information according to a keep-alive period and the command to stop collecting log information instructs the electronic device 100 to stop collecting log information which has been collected according to a keep-alive period. The command to collect emergency log information instructs the electronic device 100 to start collecting log information regardless of a keep-alive period and the command to stop collecting emergency log information instructs the electronic device 100 to stop collecting log information which has been collected by the command to start collecting emergency log information. The provision command instructs the electronic device 100 to immediately receive changed setting information from the provisioning server 202. For example, the provision command is a command to instruct the electronic device 100 to exchange setting information with the provisioning server 202 according to the push request of the push server 201.

The push server 201 may make a request for the push to the electronic device 100 according to the request for the particular operation command of the admin server 203 in operation 707. The electronic device 100 performs a particular operation according to the push request of the push server 201 in operation 709. For example, when the particular operation command is the command to start collecting log information, the electronic device 100 performs an operation to start collecting the log information according to a keep-alive period in response to the push request of the push server 201. When the particular operation command is the command to stop collecting log information, the electronic device 100 performs an operation to stop collecting the log information which has been collected according to a keep-alive period in response to the push request of the push server 201. When the particular operation command is the command to collect emergency log information, the electronic device 100 performs an operation to start collecting the log information regardless of a keep-alive period in response to the push request of the push server 201. When the particular operation command is the command to stop collecting emergency log information, the electronic device 100 may perform an operation to stop collecting the log information which has been collected by the electronic device 100 according to the command to start collecting emergency log information. When the particular operation command is the provision command, the electronic device 100 may immediately receive the changed setting information from the provisioning server 202. For example, when the particular operation command is the provision command, the electronic device 100 performs an operation to exchange the setting information with the provisioning server 202 according to the push request of the push server 201.

The electronic device 100 may transmit a result of the particular operation to the push server 201 in operation 711. For example, the result of the particular operation may correspond to the transmission of the log information.

According to various embodiments, at least part of a device (for example, modules or functions thereof) or a method (for example, operations) according to the various embodiments of the present disclosure may be embodied by, for example, one or more instructions stored in a non-transitory computer readable storage medium provided in a form of a programming module. When the command is executed by one or more processors (for example, controller 170), the one or more processors may perform a function corresponding to the command. The non-transitory computer readable storage medium may be, for example, the storage unit 140. At least a part of the programming module may be implemented (for example, executed) by, for example, the controller 170. At least a part of the programming module may include, for example, a module, a program, a routine, a set of instructions, and/or a process for performing one or more functions.

The non-transitory computer readable recording medium may include magnetic media such as a hard disk, a floppy disk, and a magnetic tape, optical media such as a Compact Disc Read Only Memory (CD-ROM) and a DVD, magneto-optical media such as a floptical disk, and hardware devices specially configured to store and perform a program instruction (for example, programming module), such as a Read Only Memory (ROM), a Random Access Memory (RAM), a flash memory and the like.

Further, the program commands may include high class language codes that can be executed in a computer by using an interpreter, as well as machine language codes that are made by a compiler. The aforementioned hardware device may be configured to operate as one or more software modules in order to perform the operation of the present disclosure, and vice versa. A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Also, a few operations may be executed based on a different order, may be omitted, or may additionally include another operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting by an electronic device, log information associated with an application executed by the electronic device, the method comprising:
    establishing, by at least one processor of the electronic device, a push service connection with a push server;
    receiving and storing setting information used for the transmitting of the log information and information on a version of the setting information from a provisioning server, wherein the setting information comprises log information collection setting value information for collecting the log information;
    collecting, by the at least one processor of the electronic device, the log information based on the log information collection setting value information until a keep-alive message transmission period arrives;
    receiving, by the at least one processor of the electronic device, the keep-alive message transmission period corresponding to the push service connection;
    in response to determining that the keep-alive message transmission period arrives:
        controlling to stop, by the at least one processor of the electronic device, collecting the log information, and transmitting, by a transceiver of the electronic device, a keep-alive message and the log information to the push server;
    receiving a keep-alive response message and information on a version of changed setting information from the push server, corresponding to the transmitted keep-alive message and log information;
    determining whether there is a difference between stored information on a version of setting information and the information on the version of the changed setting information;
    requesting setting information to the provisioning server when there is the difference between the stored information on the version of the setting information and the information on the version of the changed setting information; and
    receiving changed setting information from the provisioning server corresponding to the request for the setting information,
    wherein the keep-alive message is a message for maintaining the push service connection with the push server,
    wherein the keep-alive message transmission period is selected based on a firewall timeout policy of a communication service provider,
    wherein the log information collection setting value information comprises one or more values used for collecting log information of the electronic device, the one or more values comprising:
        a limited number of transmissions of the log information at one time,
        a limited number of transmissions of the log information in one day,
        a limited number of transmissions of the log information for each application, or a name of the electronic device or a name of the application which is restricted from collecting the log information,
wherein an admin server updates the setting information according to the information on the version of the setting information and the version of the setting information, and
wherein the admin server transmits the changed setting information and the changed information of the version of the setting information to the push server and the provisioning server.

2. The method of claim 1,
wherein the log information comprises at least one of a use state or a processed content of the application executed by the electronic device, and
wherein the application comprises at least one of:
an application of a peripheral device included in the electronic device, or
an application program included in the electronic device.

3. The method of claim 2, further comprising:
collecting additional log information when a keep-alive transmission period does not arrive.

4. The method of claim 1, wherein the setting information further comprises an address of the push server.

5. The method of claim 4, further comprising:
receiving the changed setting information from the provisioning server when there is the difference between the stored information on the version of the setting information and the information on the version of the changed setting information.

6. The method of claim 4, further comprising:
performing a particular operation when the push server having received a request for an operation command from the admin server makes a request for a push.

7. The method of claim 6, wherein the request for the operation command comprises one of:
a command to start collecting one or more pieces of log information,
a command to stop collecting log information,
a command to collect emergency log information, or
a command to stop collecting emergency log information, and a provision command.

8. The method of claim 7, wherein the particular operation comprises an operation to:
start collecting log information according to a keep-alive period when the operation command is the command to start collecting log information,
stop collecting log information when the operation command is the command to stop collecting log information which has been collected according to the keep-alive message transmission period,
start collecting log information regardless of the keep-alive message transmission period when the operation command is the command to collect emergency log information,
stop collecting log information by the command to start collecting emergency log information when the operation command is the command to stop collecting emergency log information, or
exchange the setting information with the provisioning server when the operation command is the provision command.

9. An electronic device comprising:
a memory configured to store log information;
a transceiver configured to transmit a keep-alive message and the log information; and
at least one processor configured to:
receive setting information used for the transmitting of the log information and information on a version of the setting information from a provisioning server,
store the received setting information in the memory,
wherein the setting information comprises log information collection setting value information for collecting the log information,
establish a push service connection with a push server,
collect the log information based on the log information collection setting value information until a keep-alive message transmission period arrives,
receive the keep-alive message transmission period corresponding to the push service connection, and
in response to determining that the keep-alive message transmission period arrives:
control to stop collecting the log information, and
control the transceiver to transmit the keep-alive message and the log information to the push server,
receive a keep-alive response message and information on a version of changed setting information from the push server, corresponding to the transmitted keep-alive message and log information,
determine whether there is a difference between stored information on a version of setting information and the information on the version of the changed setting information,
make a request for setting information to the provisioning server when there is the difference between the stored information on the version of the setting information and the information on the version of the changed setting information, and
receive changed setting information from the provisioning server corresponding to the request for the setting information,
wherein the keep-alive message is a message for maintaining the push service connection with the push server,
wherein the keep-alive message transmission period is selected based on a firewall timeout policy of a communication service provider,
wherein the log information collection setting value information comprises one or more values used for collecting log information of the electronic device, the one or more values comprising:
a limited number of transmissions of the log information at one time,
a limited number of transmissions of the log information in one day,
a limited number of transmissions of the log information for each application, or
a name of the electronic device or a name of the application which is restricted from collecting the log information,
wherein an admin server updates the setting information according to the information on the version of the setting information and the version of the setting information, and
wherein the admin server transmits the changed setting information and the changed information of the version of the setting information to the push server and the provisioning server.

10. The electronic device of claim 9,
wherein the log information comprises at least one of a use state or a processed content of an application executed by the electronic device, and wherein the application comprises at least one of:
- an application of a peripheral device included in the electronic device, or
- an application program included in the electronic device.

11. The electronic device of claim 10, wherein the at least one processor is configured to:
collect additional log information when a keep-alive transmission period does not arrive.

12. The electronic device of claim 9, wherein the setting information further comprises an address of the push server.

13. The electronic device of claim 12, wherein the at least one processor is further configured to:
receive the changed setting information from the provisioning server when there is the difference between the stored information on the version of the setting information and the information on the version of the changed setting information.

14. The electronic device of claim 12, wherein the at least one processor is further configured to:
perform a particular operation when the push server having received the request for an operation command from the admin server makes a request for a push.

15. The electronic device of claim 14, wherein the request for the operation command comprises:
- a command to start collecting one or more pieces of log information,
- a command to stop collecting log information,
- a command to collect emergency log information,
- a command to stop collecting emergency log information, and
- a provision command.

16. The electronic device of claim 15, wherein the particular operation comprises an operation to:
- start collecting log information according to a keep-alive period when the operation command is the command to start collecting log information,
- stop collecting log information when the operation command is the command to stop collecting log information which has been collected according to the keep-alive message transmission period,
- start collecting log information regardless of the keep-alive message transmission period when the operation command is the command to collect emergency log information,
- stop collecting log information by the command to start collecting emergency log information when the operation command is the command to stop collecting emergency log information, or
- exchange the setting information with the provisioning server when the operation command is the provision command.

* * * * *